Dec. 26, 1922.
C. E. DENGLER.
ANCHORING MEMBER FOR ELECTRICAL FIXTURES.
FILED FEB. 23, 1921.
1,440,137
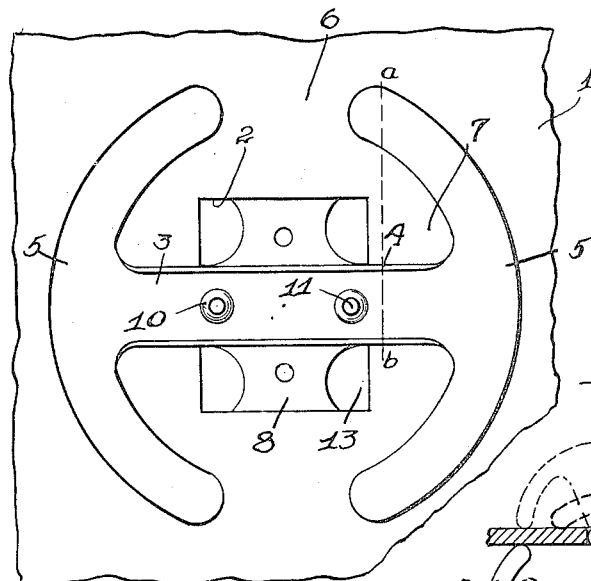
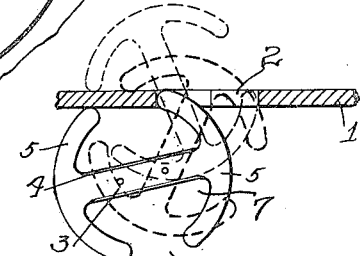
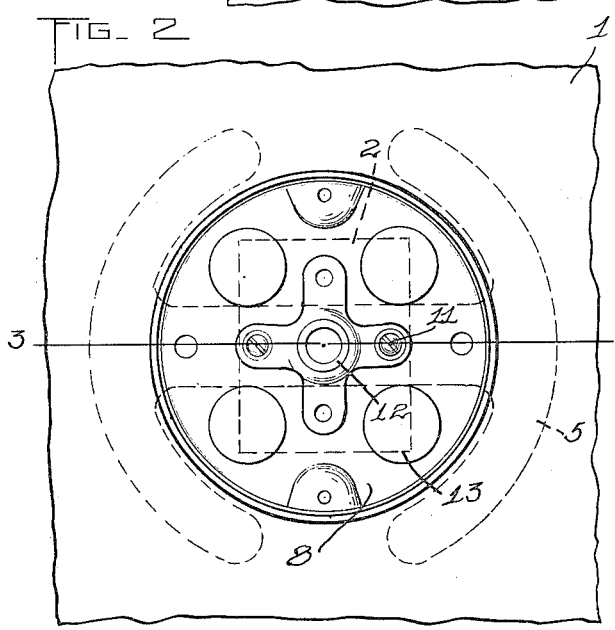
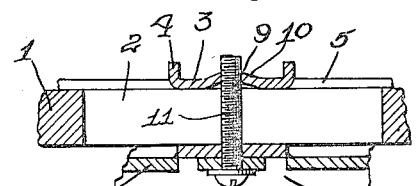
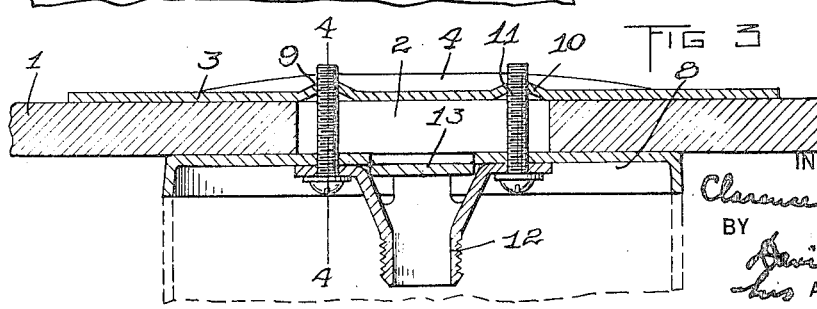
INVENTOR
Clarence E. Dengler
BY
ATTORNEYS Patented Dec. 26, 1922.

1,440,137

UNITED STATES PATENT OFFICE.

CLARENCE E. DENGLER, OF ROCHESTER, NEW YORK.

ANCHORING MEMBER FOR ELECTRICAL FIXTURES.

Application filed February 23, 1921. Serial No. 447,076.

*To all whom it may concern:*

Be it known that I, CLARENCE E. DENGLER, a citizen of the United States, and resident of Rochester, in the county of Monroe and State of New York, have invented certain new and useful Improvements in Anchoring Members for Electrical Fixtures, of which the following is a specification.

The present invention relates to an anchoring member for electrical fixtures, and an object thereof is to provide an anchoring member which will permit an outlet box or other electrical fixture to be readily installed in a building which is to be wired after the building is completed. A further object of the invention is to provide an anchoring member of the type mentioned which will give effective support to the outlet box and may be inserted in a wall opening, whose greatest diameter is less than the greatest diameter of the anchoring device. A still further object of the invention is to provide an anchoring member which will bridge an opening in the wall and will at the same time have effective bearing on opposite sides of said opening.

To these and other ends the invention consists of certain parts and combinations of parts, all of which will be hereinafter described, the novel features being pointed out in the appended claims.

In the drawings:

Fig. 1 shows the anchoring member bridged across an opening on the under side of which an outlet box is arranged;

Fig. 2 is a view of the outlet box on the opposite side of the opening;

Fig. 3 is a section on the line 3—3, Fig. 2;

Fig. 4 is a section on the line 4—4, Fig. 3; and

Fig. 5 is a view showing the manner in which the anchoring device is passed through the wall opening.

Referring more particularly to the drawings, 1 indicates the wall through which the opening 2 is cut. This opening may be of any suitable shape, but is preferably made of substantially rectangular form.

The anchoring member, in this instance, comprises a bridging or cross piece 3 preferably made from sheet metal and having its opposite edges turned up to provide flanges 4 which strengthen the cross piece longitudinally. At the opposite ends of the cross piece, supporting devices 5 are provided. These supporting devices each project from opposite sides of the cross piece and are preferably also extended inwardly toward the center of the cross piece. In this instance, the outer edge of each of these supports is formed on a curve so that in effect, two segments of an annulus are provided, the ends of the sections being spaced apart at 6. This also provides pockets or recesses 7 between the ends of the supports and sides of the cross or bridging piece 3.

By this arrangement it is possible to insert the anchoring piece through an opening whose greatest dimension is at least equal to the distance between the outer side of the support at one extreme end thereof as at the point "*a*" and the opposite side of the cross piece as at the point "*b*", this distance being indicated by the dotted line connecting the points "*a*" and "*b*". In introducing the anchor through the opening, the latter is presented sidewise to the opening as shown in full lines in Fig. 5 and is then turned so as to cause one end of the uppermost supporting device 5 to pass above the wall 1 in the manner shown in dotted lines in Fig. 5. The other supporting end 5 of the anchor is then passed through the opening 2 in the reverse manner. After the anchor is passed above the wall 1, the portion 3 is arranged to bridge the opening 2 with the supporting ends 5 resting upon the upper surface of the wall on opposite sides of said opening. With the end of securing an outlet box 8 to the anchor, the latter is provided preferably with two screw openings 9 in the bridging piece 3, the metal of the bridging piece being pressed upwardly at 10 about the openings in order to center the screws or bolts 11 which pass through the outlet box 8 and also secure a fixture anchor 12 of common form. The outlet box 8 may have in its top wall, knock out pieces 13 through which the conductors may pass from a point above the wall 1 to the fixture supported by the fixture anchor 12. The bridging piece is so arranged that the conductor wires may pass on either side thereof through the opening provided when the pieces 13 are displaced from the outlet box 8.

From the foregoing it will be seen that there has been provided an anchoring member of simple and inexpensive construction which may be readily inserted through a small opening in a wall in order that the outlet box when suspended from the anchoring piece, will cover said opening, thus making it unnecessary to touch up the wall about the outlet box. The anchor embodies a bridging portion providing space on opposite sides thereof for the passage of electric wires through the box, and this bridging piece has supporting portions at its ends which will properly support the bridging piece and will give at the same time, a wide and extended bearing on the upper face of the wall through which the opening is provided. These wide ends are so formed that the anchor may be readily passed through a small opening.

What I claim as my invention and desire to secure by Letters Patent is:

1. In combination with the wall having an opening, an anchoring member having an elongated bridging portion with supports at opposite ends projecting from the opposite sides of the bridging portion and resting on the inner face of the wall at opposite sides of the opening, the width of the supports being greater than the greatest dimension of the opening, and an electrical fixture upon the outer face of the wall, secured to the bridging portion of the anchoring member.

2. An anchoring member for electrical fixtures comprising a bridging portion to which the fixture is secured, and supports at opposite ends of the bridging portion, wider than said bridging portion, said supports projecting from opposite sides of the bridging portion and having curved outer sides and recessed inner sides.

3. An anchoring member for electrical fixtures comprising a bridging portion and two supports, one at each end of the bridging portion, each support having a shape substantially like a segment of a ring, and projecting from opposite sides of the bridging portion.

CLARENCE E. DENGLER.